(12) United States Patent
Forrester et al.

(10) Patent No.: US 6,341,419 B1
(45) Date of Patent: Jan. 29, 2002

(54) LOOP STACKED ROTOR ASSEMBLY

(75) Inventors: James M. Forrester, Springboro; Richard A. Wesling, Cincinnati, both of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/515,169

(22) Filed: Feb. 29, 2000

(51) Int. Cl.[7] .......................... B23P 15/00; B64C 11/48; G01B 7/14
(52) U.S. Cl. .................. 29/889.2; 700/279; 416/129
(58) Field of Search ............................ 310/216; 29/598, 29/407.05, 888.01, 888.012, 888.02, 889, 889.2, 889.23; 60/904; 700/279; 73/460, 461, 462, 469, 470, 474; 416/158, 160, 219 R, 129

(56) References Cited

U.S. PATENT DOCUMENTS

| | | | | |
|---|---|---|---|---|
| 4,738,591 A | * | 4/1988 | Butler | 416/129 |
| 5,214,585 A | * | 5/1993 | Ehrich | 364/463 |
| 5,502,650 A | * | 3/1996 | Naruse et al. | 364/508 |
| 5,537,861 A | * | 7/1996 | Seitelman et al. | 73/66 |
| 5,894,182 A | * | 4/1999 | Saban et al. | 310/217 |
| 6,148,518 A | * | 11/2000 | Weiner et al. | 29/889.2 |
| 6,218,753 B1 | * | 4/2001 | Asano et al. | 310/156 |

* cited by examiner

Primary Examiner—Nestor Ramirez
Assistant Examiner—Dang Dinh Le
(74) Attorney, Agent, or Firm—Andrew C. Hess; William Scott Andes (57) ABSTRACT

A plurality of rotors are individually measured for determining relative eccentricity between forward and aft annular mounting ends thereof. The measured rotor eccentricities are stacked analytically to minimize eccentricity from a centerline axis. The rotors are then assembled axially end-to-end to correspond with the stacked measured eccentricities thereof.

20 Claims, 6 Drawing Sheets

LOOP STACKED ROTOR ASSEMBLY

BACKGROUND OF THE INVENTION

The present invention relates generally to manufacturing rotor assemblies, and, more specifically, to the assembly thereof.

A gas turbine engine is an example of a large rotary machine requiring dimensional precision for reducing vibration at high rotational speed. Vibration may occur due to mass unbalance around an axial centerline axis of the engine, or due to eccentricity of the rotor therearound.

Eccentricity is a particular concern in an assembly of rotor components since the interconnecting joints therebetween may contribute to eccentricity. The individual rotors in a typical gas turbine engine vary in configuration for aerodynamic, mechanical, and aero-mechanical reasons which increases the complexity of the engine design and the difficulty in reducing undesirable eccentricity.

For example, a multistage axial compressor includes rows of decreasing size compressor blades extending radially outwardly from supporting rotor disks. The blades may be removably mounted in corresponding dovetail slots formed in the perimeter of the disks, or may be integrally formed therewith in a unitary construction known as a blisk. Individual disks may be bolted together at corresponding annular flanges having a row of axial bolt holes through which fastening bolts extend for joining together the several rotors in axial end-to-end alignment.

Some rotor disks are typically formed in groups in a common or unitary rotor drum, with the drum having end flanges bolted to adjoining rotors having similar annular flanges therefor.

Accordingly, the multistage assembled compressor rotor includes several rotor disks axially joined together at corresponding annular flanges. Each rotor is separately manufactured and is subject to eccentricity between its forward and aft mounting flanges, and is also subject to non-perpendicularity or tilt of its flanges relative to the axial centerline axis of the engine.

Both eccentricity and tilt of the rotor end flanges are random and preferably limited to relatively small values. However, the assembly of the individual rotors with their corresponding flange eccentricities and tilts is subject to stack-up and the possibility of significantly larger maximum eccentricity and tilt collectively due to the individual eccentricities and tilts.

Accordingly, when the rotor assembly is mounted in bearings in the supporting engine stator, the corresponding rotor seats or journals mounted in the bearings may have relative eccentricity and tilt therebetween, and intermediate flange joints between individual rotors of the assembly may have an eccentricity from the engine centerline axis which exceeds the specified limit on eccentricity for the rotors due to stack-up. In this case, the rotor assembly must be torn down and reassembled in an attempt to reduce stackup eccentricities and tilt to an acceptable level within specification.

One manner of reducing the random nature of the assembly stackup is to measure each rotor during the assembly sequence to determine the eccentricity and tilt between its end flanges and then assembling that component to a preceding component for reducing the collective stackup of eccentricity and tilt upon final rotor assembly.

Measurement equipment for effecting this sequential assembly process has been commercially available and used in this country for several years. Individual rotors are mounted on a turntable using a suitable fixture therefor so that the rotor may be rotated about its axial centerline axis. Linear measurement gauges are mounted to the table and engage the two corresponding mounting flanges of the rotor for measuring any variation of radius of the flanges from the axial centerline axis around the circumference of the flanges, and for measuring any variation in axial position of each of the flanges around the circumference.

The gauges are operatively joined to a digitally programmable computer controller which simultaneously receives the measurement data from the two gauges mounted at each end flange during inspection. The controller is programmed to calculate various geometric parameters for the two end flanges. In particular, the radial measurement data may be used to calculate both eccentricity and concentricity of the end flanges represented by deviation from a calculated center and a datum axis. In this way, relative eccentricity between the two end flanges may be measured and may be represented by a vector having an eccentricity magnitude and rotary or angular direction relative to a suitable reference point on the rotor.

Additionally, the controller may calculate non-perpendicularity or tilt of the end flanges relative to a datum plane or axis. In this way, relative tilt between the axial end faces of the flanges may be determined in the form of another vector having an angular tilt magnitude and angular direction relative to the rotor reference.

Since both eccentricity and tilt affect the final eccentricity of the assembled rotors, both factors are used in assembling the rotors. However, the tilt vector must be suitably transformed into a corresponding eccentricity at either one of the rotor journals being mounted in the bearings. This is readily accomplished using simple trigonometry to project the relative tilt for each of the rotor components to the same end journal axial plane for determining the corresponding projected eccentricity thereat. The measured eccentricity for each rotor may be vector summed with the projected eccentricity corresponding with the rotor tilt vector to provide a total eccentricity vector for the individual rotor having magnitude and angular direction.

During typical assembly of a multi-rotor axial compressor, each rotor is measured for eccentricity and tilt and the total eccentricity vector therefor is determined. The rotors are measured, inspected, and assembled in turn so that the total eccentricity vector for each subsequent rotor is assembled to the preceding rotor either directly in phase, or with the vectors being 180 degrees out of phase. Since the length of the vectors correspond with the individual magnitudes of eccentricity, the rotors are assembled in turn so that the corresponding vectors balance each other in addition or subtraction as required for minimizing the final eccentricity between the first rotor and the last assembled rotor.

The eccentricity and tilt of the individual rotors is thusly substantially balanced from rotor to rotor, but typically results in some remaining eccentricity between the two journal ends of the completed rotor assembly. Furthermore, the in or out of phase alignment of the eccentricity vectors is random as the adjoining rotors are interconnected, with the vectors being added or subtracted.

Accordingly, upon final inspection of the assembled rotor either the net eccentricity between the end journals or an inter-rotor eccentricity may nevertheless exceed the specified limit on eccentricity. This would then require teardown of the rotor assembly and re-assembly in an attempt to reduce net eccentricity and stage eccentricity to within acceptable limits.

Accordingly, it is desired to improve the assembly process of multiple rotors for minimizing eccentricity thereof from a common axial centerline axis.

BRIEF SUMMARY OF THE INVENTION

A plurality of rotors are individually measured for determining relative eccentricity between forward and aft annular mounting ends thereof. The measured rotor eccentricities are stacked analytically to minimize eccentricity from a centerline axis. The rotors are then assembled axially end-to-end to correspond with the stacked measured eccentricities thereof.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
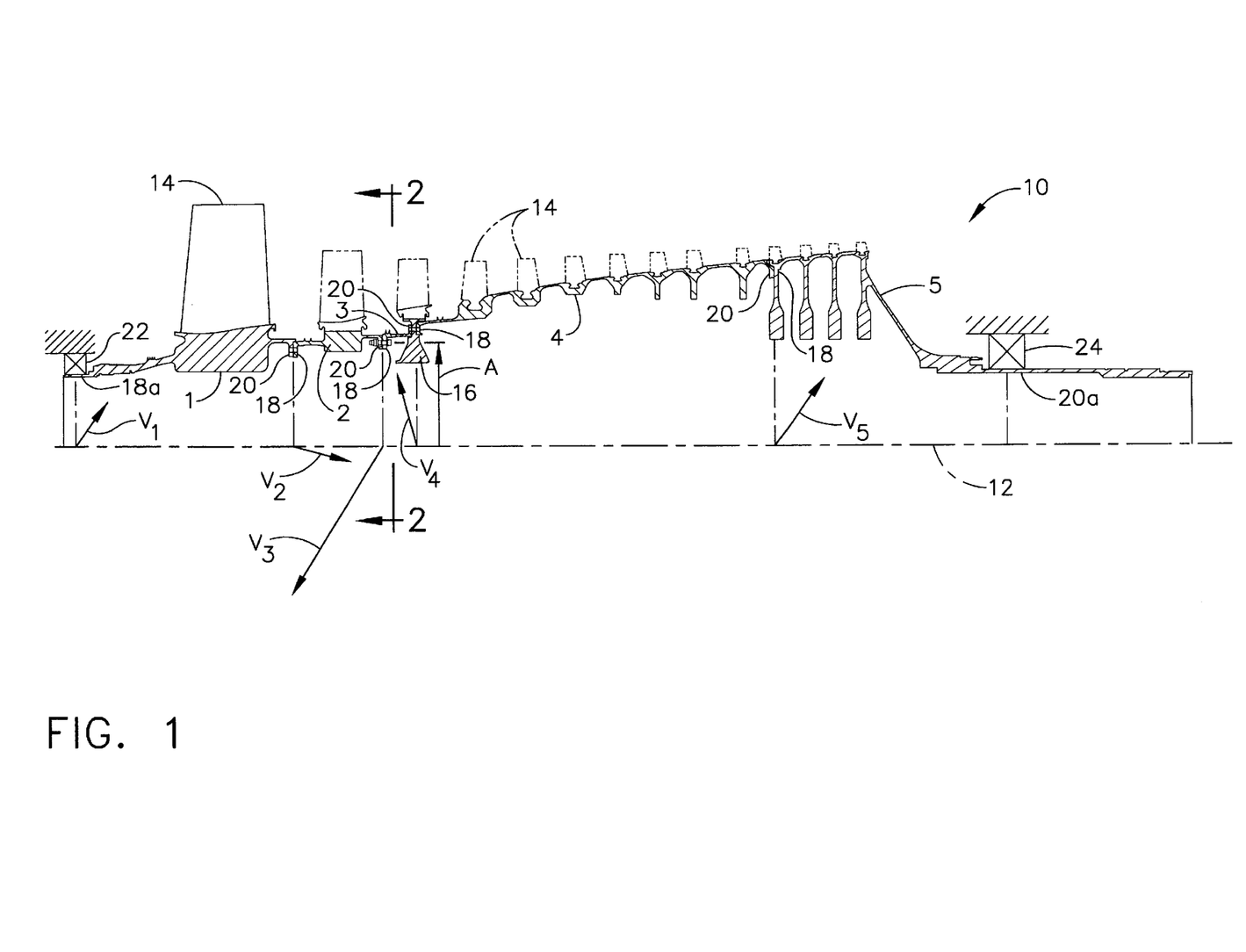
FIG. 1 is an axial sectional view through an exemplary multi-rotor assembly joined together at corresponding flange joints in an exemplary method of the present invention.

Illustrated in FIG. 1 is an exemplary rotor assembly 10 in the form of a high pressure compressor rotor spool for a gas turbine engine. The rotor assembly includes a plurality of discrete annular component rotors 1–5 disposed coaxially about an axial centerline axis 12.

The component rotors may have any suitable form for use in the engine. For example, a forward or first rotor 1 is in the form of annular disk from which extends radially outwardly a row of rotor blades 14. The rotor disk 1 is in the exemplary form of a blisk in which the blades are integrally formed therein in a unitary or one-piece component.

A second rotor disk 2 follows in turn the first rotor and includes axial dovetail slots in the perimeter thereof in which are mounted a corresponding row of additional rotor blades 14, shown in phantom.

A third rotor 3 follows in turn the second rotor and is in the form of a tubular spacer joined to another rotor disk 16 having axial dovetail slots supporting another row of rotor blades 14.

Disposed downstream in turn from the third rotor 3 and its attached disk 16 is a fourth rotor 4 in the form of a tubular drum including several axially spaced apart integral disks therein, each having circumferentially extending dovetail slots which support corresponding rows of additional compressor blades 14.

Lastly, a fifth rotor 5 is disposed aft of the fourth rotor and includes several more interconnected rotor disks having circumferential dovetail slots supporting additional rows of compressor blades therein.

Each of the exemplary five rotors 1–5 illustrated in FIG. 1 includes forward and aft annular mounting ends 18,20, respectively. The opposite rotor ends are used for fixedly joining together the several rotors end-to-end and for additionally supporting the rotor assembly 10 in a pair of axially spaced apart annular forward and aft bearings 22,24 mounted in corresponding stator frames of the engine in a conventional manner.

The first or forward rotor 1 illustrated in FIG. 1 has a cylindrical forward end, designated 18a, which defines a seat or journal for being mounted in the forward bearing 22. The fifth or aft rotor 5 has a cylindrical aft mounting end, designated 20a, defining another seat or journal for being mounted in the aft bearing 24.

Figure 2:
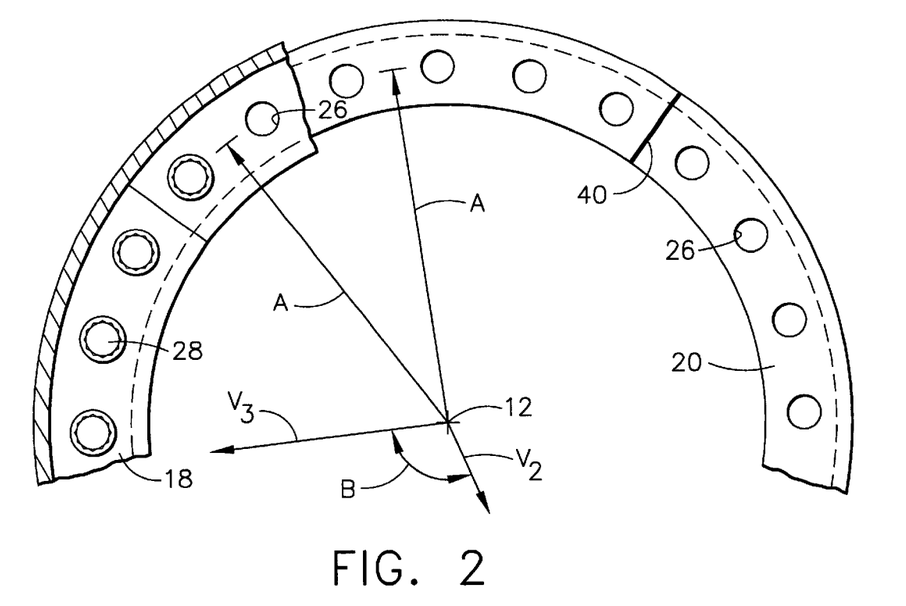
FIG. 2 is a partly sectional radial view through respective portions of exemplary mating flanges of the rotor assembly illustrated in FIG. 1 and taken along line 2—2.

But for the cylindrical rotor ends 18a,20a for mounting the rotor assembly in the two bearings 22,24, the remaining mounting ends of the individual rotors have suitable form such as annular radial flanges each having a plurality of circumferentially spaced apart bolt holes 26, as illustrated in FIG. 2, extending axially therethrough which receive corresponding fasteners 28 in the form of bolts and corresponding retention nuts. In this way, the several rotors may be axially bolted together to define the integral rotor assembly 10 which rotates during operation in the two bearings 22,24 supporting the forward end of the first rotor and the aft end of the last rotor.

As shown in FIG. 1, the individual rotors 1–5 have correspondingly different configurations for use in their specific location in the gas turbine engine, such as in the multistage axial compressor rotor spool illustrated. The first rotor 1 includes forward and aft annular extensions at which the forward end journal 18a and aft radial flange 20 are defined. Similarly, the second rotor 2 includes corresponding extensions at which the forward and aft radial flanges 18,20 are defined.

The third rotor 3 is in the form of a tubular spacer having opposite radial flanges mounted to the second rotor and the web of the individual disk 16.

The fourth rotor 4 has a forward end 18 mounted to the web of the disk 16 oppositely with the third rotor 3. The aft end flange 20 of the fourth rotor 4 is joined to a corresponding forward end flange 18 defined in the web of the first disk of the fifth or aft rotor 5. And, the last disk of the fifth rotor 5 is integrally joined to a supporting cone terminating in a cylindrical journal defining the aft cylindrical end 20a mounted in the aft bearing 24.

The two bearings 22,24 mounted in the engine define the axial centerline axis 12 with which the rotor assembly 10 should be mounted coaxially with minimal radial eccentricity therefrom to reduce rotor imbalance during operation.

However, as described above, the individual rotors 1–5 are subject to random dimensional variation during manufacture which affects their individual and collective concentricities relative to the centerline axis. An exemplary one of the flange joints between adjoining rotors is illustrated in more detail in FIG. 2. Each mounting end 18,20 is annular, and the bolt holes 26 are arranged circumferentially at a common radius A from the centerline axis 12, subject to manufacturing tolerances.

Figure 3:
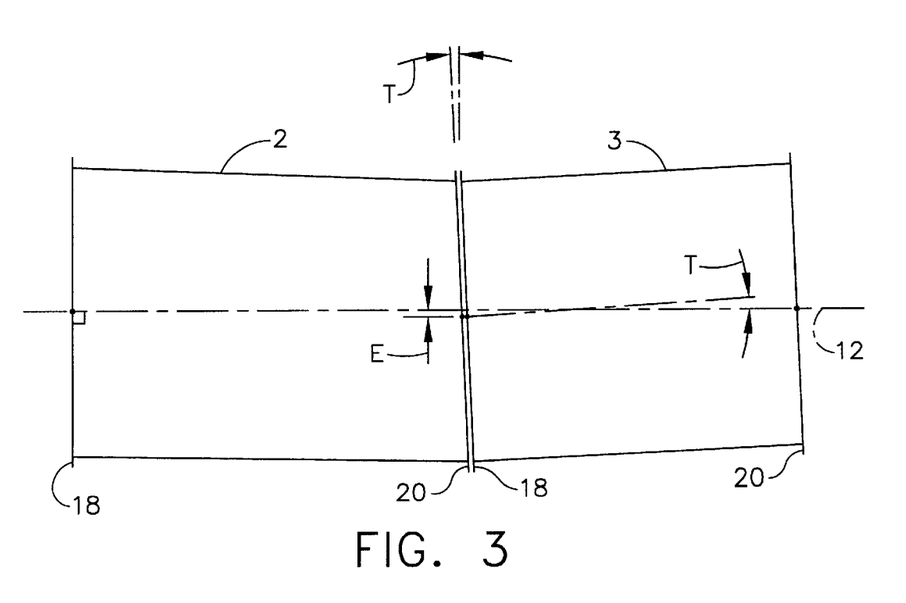
FIG. 3 is a schematic representation of two adjoining rotors of the assembly illustrated in FIG. 1 for showing eccentricity and tilt of end flanges thereof.

FIG. 3 illustrates schematically two exemplary adjoining rotors, such as the second and third rotors 2,3 illustrated in FIG. 1, having eccentricity and non-perpendicularity of the mounting ends thereof which affect assembly of the individual rotors and the concentricity thereof. Since the two mounting ends of the individual rotors are axially spaced apart from each other they are subject to relative eccentricity E between the nominal centers thereof. The eccentricities are additive from rotor to rotor and affect the concentricity between the journal ends 18a,20a of the rotor assembly when mounted in its bearings as illustrated in FIG. 1.

Furthermore, the radial end flanges 18,20 are preferably perpendicular to the centerline axis 12, yet due to manufacturing tolerances often have a non-perpendicular tilt T relative to the centerline axis. The non-perpendicularity or end face tilt T is a relative angular deviation between the two mounting ends 18,20 of each of the rotors. The end face tilt of each rotor also affects the concentricity of the rotor assembly at the two bearings 22,24 illustrated in FIG. 1.

The concentricity is affected by the specific diameter of each of the rotors at the corresponding mounting ends, and by the linear distance between each of the tilted mounting ends and the corresponding bearing axial plane. The further away from the bearing plane that the tilted mounting end is located, the greater will be its affect on projected eccentricity thereat.

Accordingly, measurement of the rotor eccentricity and tilt may be used for improving the assembly of the rotors in the resulting rotor assembly for minimizing eccentricity between the opposite ends of the assembly mounted in the bearings.

Figure 4:
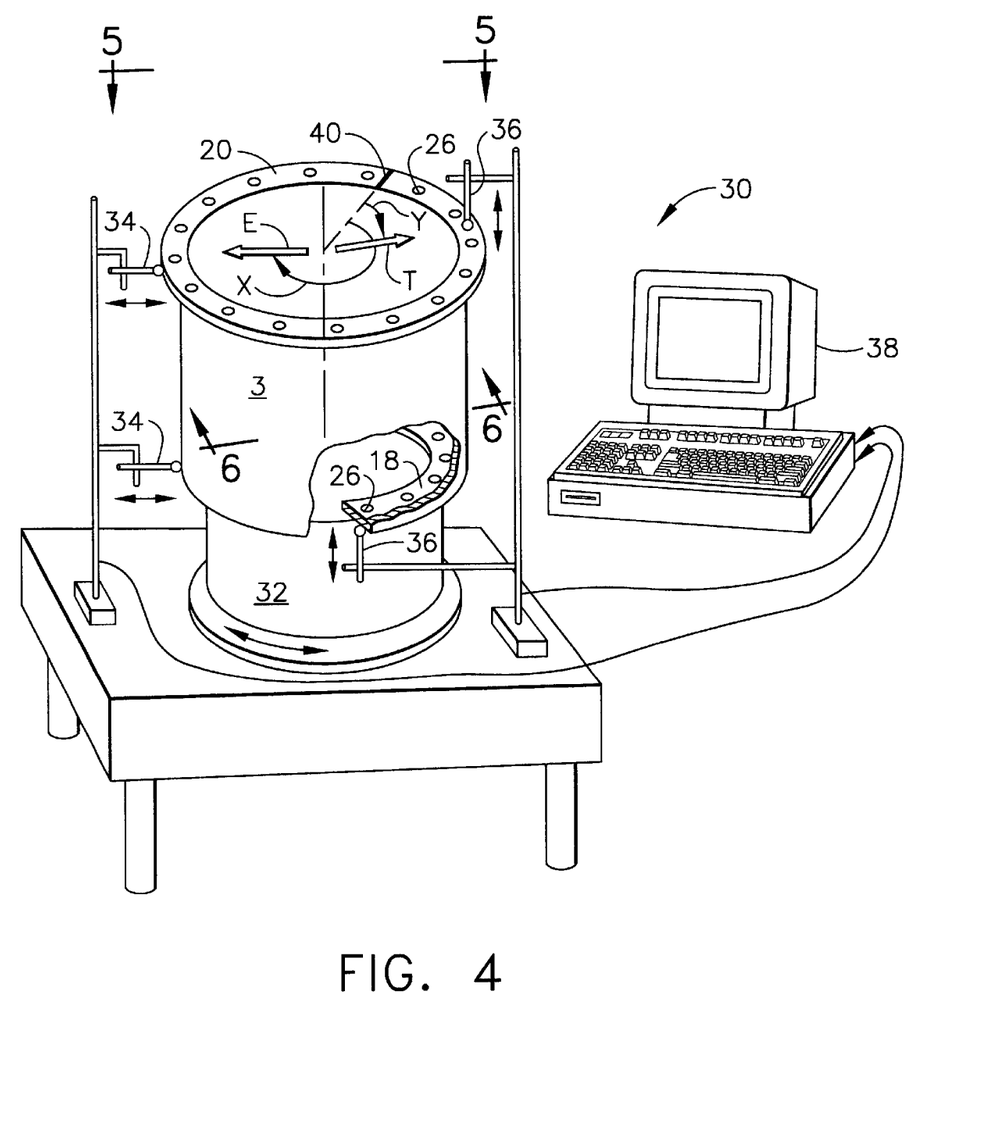
FIG. 4 is a schematic representation of an apparatus for measuring eccentricity and tilt of each of the rotors illustrated in FIG. 1.

FIG. 4 illustrates schematically an apparatus 30 for inspecting the individual rotors illustrated in FIG. 1 for measuring any eccentricity E and non-perpendicularity or tilt T therein. The measuring apparatus includes a turntable 32 and cooperating fixture upon which any of the individual rotors 1–5 may be vertically mounted. The fixture is configured for supporting the specific configuration of any of the different rotors for permitting access to the two mounting ends 18,20 thereof.

A pair of first linear measurement gauges or probes 34 are mounted on a supporting table to contact the rotor at the corresponding mounting ends 18,20. For example, the first probes 34 may contact any available radially inner lip or land or radially outer lip or rabbet within the immediate vicinity of the corresponding rows of bolt holes 26. The first probes are used for measuring variations in radius of the mounting ends as the rotor is rotated atop the turntable 32 about its vertical rotary axis.

In another example where a rabbet is not found near the row of bolt holes, a precision ring is mounted concentrically with the row of bolt holes by integral pins extending therein. The ring has a cylindrical land at which the radius measurement may be taken by the first probe for determining the eccentricity of the row of bolt holes.

A second pair of linear position gauges or probes 36 are similarly mounted atop the table in contact with the axial faces of the respective mounting ends 18,20 around which the rows of bolt holes are formed.

The first and second probes 34,36 are operatively joined to a digitally programmable computer controller 38 which measures and records the individual displacement readings from the four probes as the rotor is turned atop the turntable 32. For a perfect rotor with concentric and perpendicular mounting ends, mounted coaxially atop the turntable 32, the individual probes will read no variation in radial position around the two mounting ends and no variation in axial position of the faces. However, in practice manufacturing tolerances will lead to variations in radial and axial positions of the two mounting ends, with corresponding eccentricity and non-perpendicularity or tilt thereof.

The controller 38 is programmed to calculate a geometric center of the radial measurements made by the first probes 34 at each mounting end, and then determine the eccentricity from a reference axis such as the rotor centerline axis.

Accordingly, the controller 38 is programmed for measuring relative eccentricity between the axially spaced apart forward and aft annular mounting ends 18,20 of each of the several rotors 1–5 forming the rotor assembly 10.

Furthermore, the controller 38 may be configured for measuring relative tilt T or non-perpendicularity between the rotor forward and aft ends 18,20 by measuring the axial variation in the axial face planes thereof. Any tilt of the ends 18,20 will cause variation in the axial positions thereof as measured by the second probes 36. This data may be suitably reduced to define the corresponding tilted planes and assign an angular tilt value T therefor.

As shown in FIG. 4, the measured relative eccentricity E is preferably in the form of a vector having a magnitude of relative eccentricity between the rotor forward and aft ends 18,20, and an angular orientation or direction X from a suitable reference feature or point 40 found around the circumference of the rotor. Similarly, the relative tilt T is also in the form of a vector whose length corresponds with the magnitude, and having an angular orientation or direction Y preferably measured from the same reference point 40.

Figure 5:
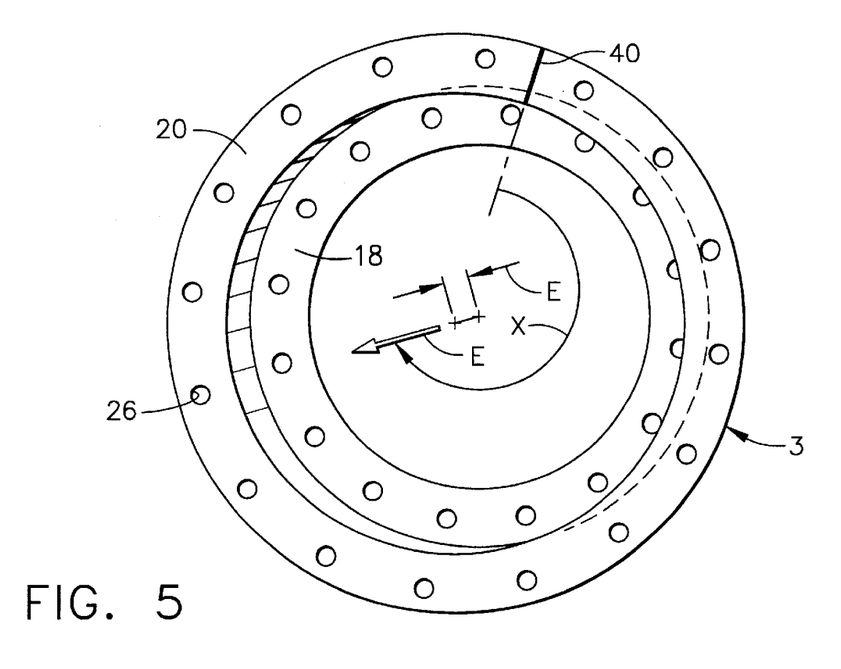
FIG. 5 is a top view of the exemplary rotor illustrated in FIG. 4 and taken along line 5—5 for showing exemplary eccentricity thereof quantified in a vector having magnitude and angular direction from a reference point on the rotor.
Figure 6:
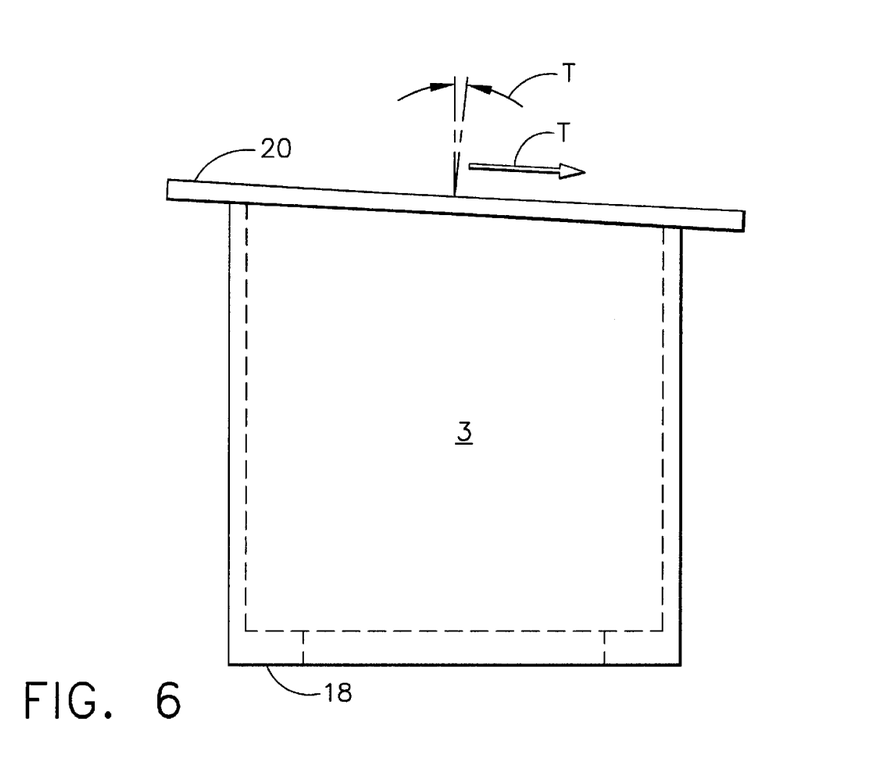
FIG. 6 is a side elevational view of the rotor illustrated in FIG. 4 and taken along line 6—6 for showing relative tilt between the top and bottom end flanges as quantified by a corresponding vector having magnitude and angular direction relative to the reference point illustrated in FIG. 4.

FIG. 5 is a top view of the exemplary rotor illustrated in FIG. 4 showing greatly exaggerated the eccentricity E between the two mounting ends 18,20 and the corresponding arrow vector representation thereof. FIG. 6 is a side view of the rotor illustrated in FIG. 4 showing the relative tilt T between the two ends 18,20 and the corresponding tilt arrow vector therefor.

As above described, the measuring apparatus 30 and its use in measuring rotor eccentricity and tilt for obtaining the corresponding eccentricity and tilt vectors is conventional, and has been in commercial use in this country for several years.

The relative tilt of each of the rotors 1–5 illustrated in FIG. 1 affects overall concentricity or eccentricity of the rotor assembly due to the particular diameter of the rotor at the corresponding mounting ends and due to the axial distance between the mounting end and a common one of the bearing axial planes. In order to combine the different measurement units of eccentricity and tilt from the individual rotors, the tilt vector T for each of the rotors, except the last assembled rotor directly adjoining its bearing support, is transformed to a projected eccentricity at the corresponding bearing plane. For example, the tilt vectors for rotors 2–5 may each be transformed to corresponding projected eccentricity vectors at the axial plane of the first bearing 22 which supports the forward end of the first rotor 1.

Accordingly, the cylindrical rotor end 18a of the first rotor mounted in the first bearing 22 may be the axial plane at which the projected eccentricity for each of the other rotors is determined. Alternatively, the axial plane of the second bearing 24 in which the cylindrical rotor end 20a is mounted may be the common plane to which the tilt vectors for the first four rotors 1–4 may be projected.

Axial projection of the tilt vectors involves simple trigonometry to convert the relative tilt of the rotor flanges at their corresponding radii at their corresponding axial distance from the common bearing plane to a projected eccentricity thereat. This is illustrated schematically in the vector diagram of FIG. 7 wherein the tilt vector T is transformed to a projected tilt vector T(E) having a corresponding projected eccentricity at the common bearing plane.

Figure 7:
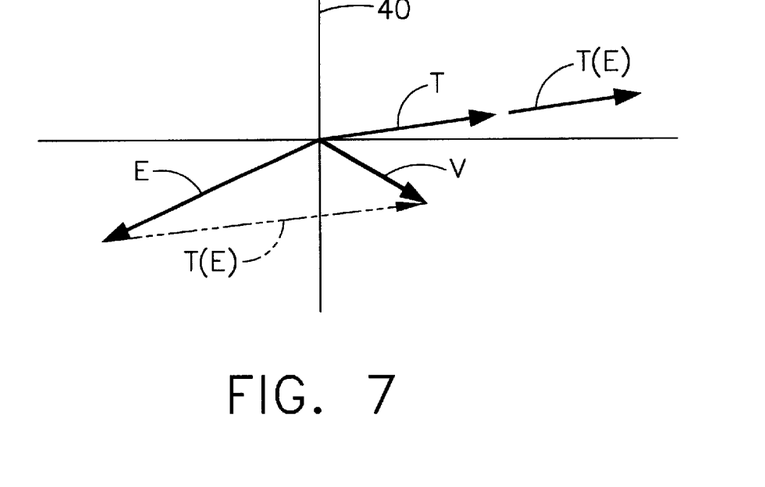
FIG. 7 is a schematic representation of the eccentricity and tilt vectors for the common rotor illustrated in FIGS. 4–6 including a transformation vector for the tilt vector and a total vector for the sum thereof.

In this way, the measured eccentricity vector E and the projected tilt vector T(E) may undergo vector addition to create a resultant total vector V having an effective eccentricity and corresponding angular position relative to the reference point 40 for each of the several rotors. The generation of the effective or total eccentricity vector V for each of the rotors is also conventionally known.

However, as indicated in the Background section described above, the conventional method of assembling the rotor assembly illustrated in FIG. 1 includes measuring the eccentricity and tilt of each rotor component in turn as they are assembled in sequence. The assembly sequence may start with the first rotor 1 or the last rotor 5 and attaching in turn the remaining rotors in the required sequence.

For example, the fifth rotor 5 may be first measured and positioned for assembly. The fourth rotor 4 may then be measured and assembled to the fifth rotor with the corresponding total eccentricity vectors V thereof typically being aligned 180 degrees out of phase. The third, second, and first rotors are then measured and assembled in turn, with the corresponding total vectors thereof being aligned 180 degrees out of phase with the previous rotor vector or in phase therewith as required to minimize net eccentricity across the assembly.

Upon reaching the lastly assembled rotor, such as the first rotor 1, the different magnitude vectors of the several rotors will typically result in a non-zero net eccentricity between the forward bearing end 18a and the aft bearing end 20a. It is noted that relative tilt of the lastly assembled rotor 1 is not relevant to the eccentricity of the forward bearing end 18a thereof, and therefore the total eccentricity vector therefor includes solely its measured eccentricity vector.

As also indicated in the Background section, this conventional method of assembling the several rotors may result in excessive eccentricity of the rotors between the two bearing planes, as well as excessive eccentricity at any one or more of the flange joints therebetween. Unacceptable eccentricity magnitudes will require disassembly of the rotor spool and re-assembly thereof in different rotary index alignment of the respective rotors based on experienced trial and error, which may also include the substitution or swapping of one or more rotors from inventory. This process is repeated until suitably low relative eccentricity between the bearing planes and the inter-rotor joints is obtained.

In accordance with the present invention, an improved method of assembling the several rotors 1–5 utilizes the same measured eccentricity and tilt measurements and corresponding vectors therefor combined in the resultant eccentricity vectors V illustrated in FIG. 7 for example. The individual rotors are not simply measured and assembled in turn as previously done, but instead all of the rotor components of the intended assembly are pre-measured for determining the corresponding eccentricity vectors V therefor.

Figure 8:
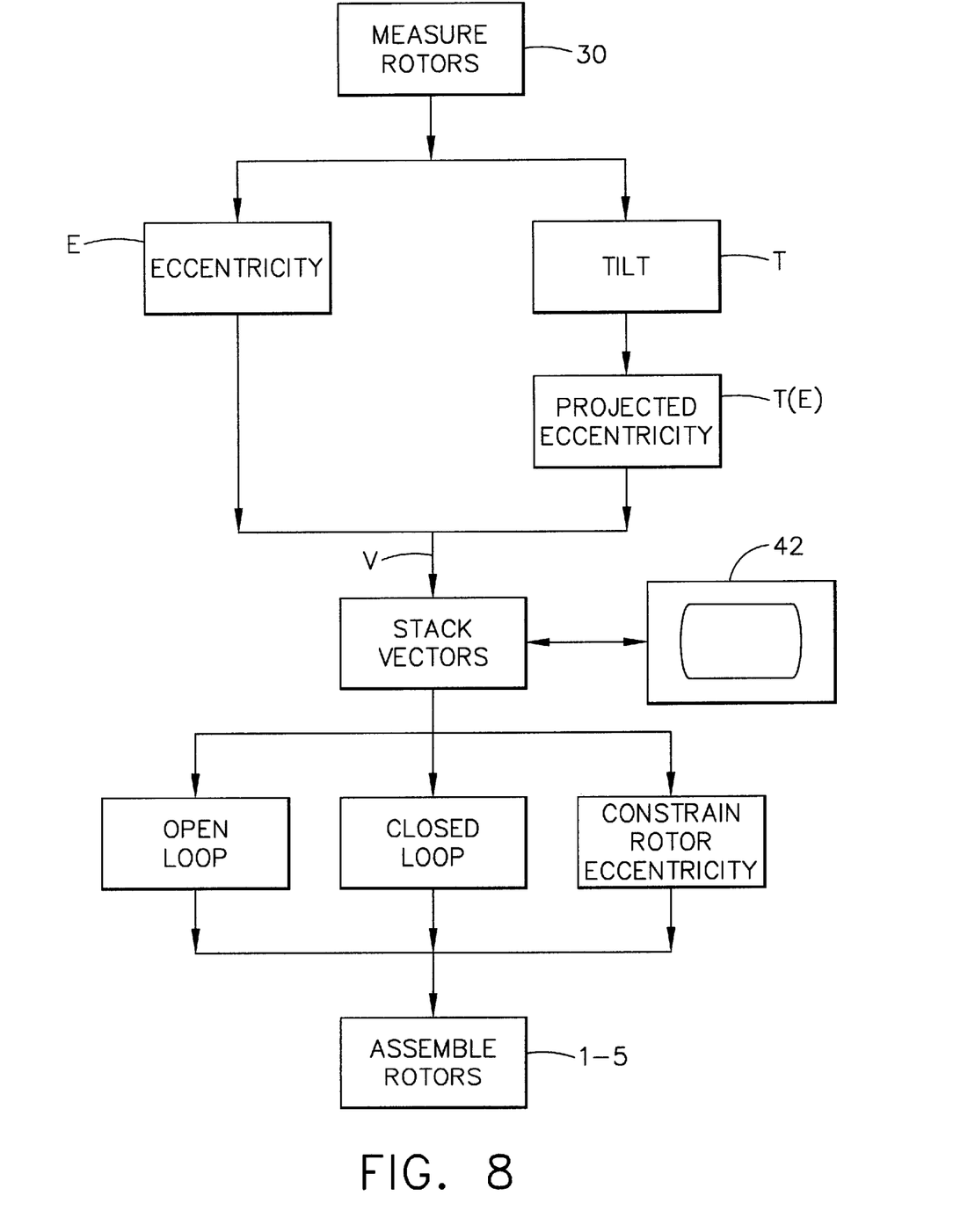
FIG. 8 is a flowchart representation of an exemplary method of measuring and assembling the rotors illustrated in FIG. 1 in accordance with an exemplary embodiment of the present invention.

Then, as illustrated schematically in FIG. 8, all of the eccentricity vectors V are analytically stacked together in a digitally programmable computer 42 to reduce or minimize the eccentricity from the intended centerline axis 12 for the assembly illustrated in FIG. 1. By determining in advance the best practical orientation of the individual rotors for minimizing eccentricity, the rotors may then be physically assembled axially end-to-end to correspond with the stacked measured eccentricities thereof as represented by the total vectors V.

Figure 9:
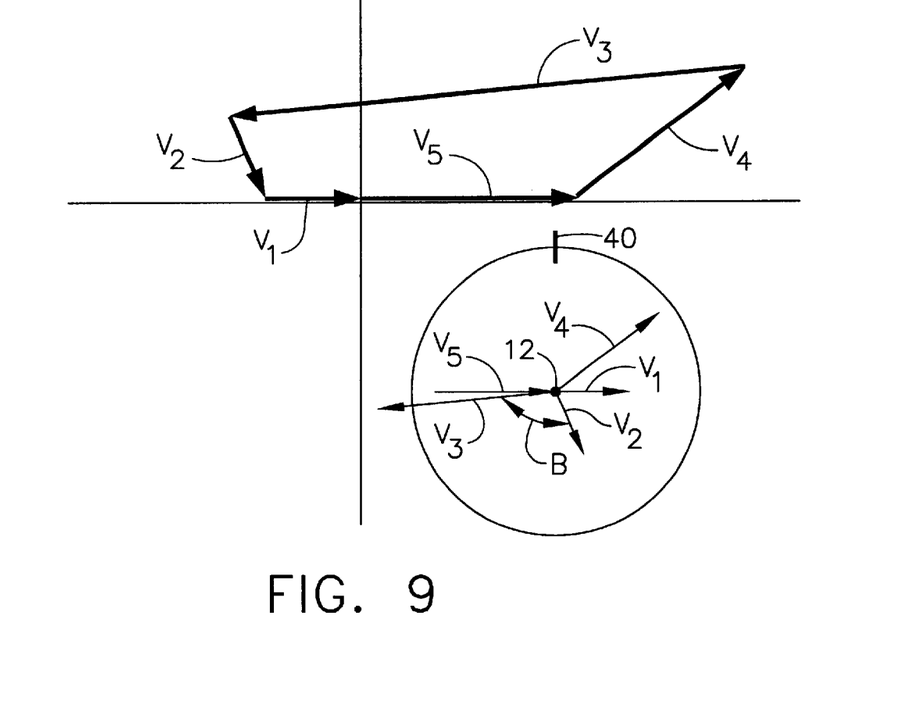
FIG. 9 is a schematic representation of the total measured eccentricity and transformed tilt vectors for five exemplary rotors of the assembly illustrated in FIG. 1 analytically stacked together in closed loop addition in accordance with an exemplary embodiment of the present invention, and the corresponding rotary positions thereof for the corresponding assembled rotors therefor.

FIG. 9 illustrates an exemplary one of an infinite range of analytically stacked vectors V1–5 corresponding with the five rotors 1–5 illustrated in FIG. 1. The vectors V are stacked sequentially in the same order corresponding with the rotors 1–5 which they represent. The vectors are analytically stacked in vector addition from head-to-foot in a generally annular loop, as opposed to a straight line stacking of vectors in or out of phase. The vector loop addition illustrated in FIG. 9 permits the relative angular direction of the individual vectors to vary from vector to vector as desired and infinitely increases the permutations available for assembling the several rotors.

Analytically stacking the several vectors corresponding with the individual rotors permits iteration thereof to minimize relative eccentricity between the forward and aft rotors 1,5 at the corresponding supporting bearings 22,24 and obtain in advance a practical best fit assembly.

In the preferred embodiment illustrated in FIGS. 8 and 9, the vector stacking is iterated to preferably close the vector loop so that the first and last vectors V1 and V5 touch head-to-foot. This is possible if the longest vector, such as vector V3, is less than the combined lengths of all the remaining vectors, such as V1, V2, V4, and V5.

The significance of closing the vector loop is that the relative or net eccentricity between the forward bearing end 18a of the first rotor and the aft bearing end 20a of the fifth rotor can be reduced to zero.

The ability to close the vector loop is determined by the respective magnitudes of the individual eccentricity vectors V. For substantially all rotor embodiments similar to FIG. 1, the multiple vectors may be iterated to a closed loop. However, for some embodiments, the loop may not close, but the distance between the first and fifth vectors V1,V5 can nevertheless be minimized to a non-zero small value. In this latter embodiment the relative eccentricity between the assembled rotors at the two bearings is nevertheless reduced, and should be reduced significantly over conventionally assembled rotors.

Since the exemplary eccentricity vectors illustrated in FIG. 9 typically have different magnitudes as represented by their lengths, and may be oriented at different angular positions, there is practically infinite combinations thereof. Accordingly, the number of possible vector loops may be reduced to advantage by additionally constraining the vector loop to minimize eccentricity of any one or more or all of the rotors intermediate the forward and aft rotors 1,5.

For example, the individual rotors may be stacked so that the respective eccentricity and tilt thereof may accumulate from rotor to rotor, with maximum eccentricity at the middle of the rotor assembly and then decreasing to the opposite end of the assembly. This is analogous to the rotor assembly sagging or deflecting along the centerline axis between its two mounting bearings.

The resulting eccentricity at the middle of the assembly may be within permitted values or may exceed the permitted value. Avoiding excessive eccentricity at the several flange joints may be effected in advance by constraining the vector loop to minimize the corresponding inter-vector eccentricities.

Since the several vectors illustrated in FIG. 9 are mathematical representations of the measured rotor eccentricity and projected eccentricities of the correspondingly measured rotor tilts, they may be added in vector diagrams in any suitable manner such as being automated using conventional software. For example, the Microsoft Excel Spreadsheet software is a convenient means loaded in the computer 42 for defining the individual vectors and assembling or adding them in either open or closed loops as possible. The software may be readily constrained to limit eccentricity from the axial centerline axis at any one or more of the rotor flange joints as represented by the vector intersections.

The software may be configured to constrain closing of the vector loop with a goal of limited inter-vector eccentricity if possible. Alternatively, the inter-vector eccentricity may be limited as a constraint, with the goal of closing the vector loop if possible.

In the FIG. 9 embodiment, the vector loop has been closed while also limiting inter-vector eccentricity to a specified value, such as about 1.5 mils, for example.

From the vector diagram illustrated in FIG. 9, the actual rotors 1–5 illustrated in FIG. 1 may then be assembled coaxially about the centerline axis 12 with different rotary positions or indexing corresponding with the different angular directions of the several vectors V. Each eccentricity vector V in the vector loop of FIG. 9 corresponds with the total vector V illustrated in FIG. 7 which is the sum of the measured eccentricity E and the transformed or projected tilt eccentricity T(E). The different angular directions of the vectors E and T(E) have a collective angular direction represented by the orientation of the total vector V.

By assembling the individual rotors 1–5 with respective rotary position so that their combined measured eccentricity and tilt correspond with the angular directions of the respective vectors illustrated in FIG. 9, the so-assembled rotors enjoy the reduced eccentricity determined in advance of actual assembly. Since the actual physical rotary position of the individual rotors is limited in resolution by the spacing between the bolt holes 26 illustrated in FIG. 2, the rotors are assembled for aligning the mating bolt holes with the closest approximation to the rotary positions illustrated in FIG. 9.

The relative rotary positions of the adjoining rotors illustrated in FIGS. 1 and 2 may be matched to the vector loop illustrated in FIG. 9 by the angular orientation of the corresponding vectors V relative to a common reference point 40. The individual rotors are indexed or clocked from each other by corresponding included angles B equal in magnitude to the corresponding angles between the sequential vectors in the assembly sequence. This may be effected by marking the rotary position of each vector on the corresponding rotor end flanges as reference points, and indexing the flanges with the corresponding included angle between the markings. Or, reference points may be provided on the flanges which already include the required included vector angles between adjoining rotors, and the points are simply aligned with each other for properly indexing and stacking the rotors.

A rotor assembly of only two rotors has only two eccentricity vectors V which would typically be assembled 180 degrees out of phase. A rotor assembly including only three rotors has three corresponding eccentricity vectors which may be formed in a closed loop triangle depending upon the magnitudes thereof.

In an assembly having three or more rotors, the corresponding relative eccentricities as defined by the eccentricity vectors V thereof will typically have different angular directions around the centerline axis and will most likely not be either in phase or 180 degrees out of phase.

As the number of rotors in the assembly increases, the corresponding number of vectors also increases and increases the possible permutations of the vector addition. These increased permutations may be used to advantage to minimize the relative eccentricity between the bearing ends of the rotor assembly as well as reduce inter-rotor eccentricity.

The method described above for firstly measuring eccentricity of the individual rotors prior to assembly, and then mathematically stacking the resulting vectors for minimizing eccentricity of the assembled rotors results in a rotor assembled in a configuration not previously possible. As shown in FIG. 2, for example, the relative rotary positions B from rotor to rotor will correspond with the relative angular directions of the corresponding eccentricity vectors V therefor which will be quite different than the simple in phase or out of phase orientation of rotors previously obtained. The resulting rotor assembly therefore enjoys reduced or eliminated eccentricity between its bearing planes, and may additionally enjoy reduced inter-rotor eccentricity therebetween.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A method of axially assembling a plurality of annular rotors about an axial centerline axis comprising:
  measuring relative eccentricity between forward and aft annular mounting ends of each of said rotors;
  analytically stacking said measured rotor eccentricities to minimize eccentricity from said centerline axis; and
  assembling said rotors axially end-to-end to correspond with said stacked measured eccentricities thereof.

2. A method according to claim 1 wherein:
  said measured rotor eccentricity comprises a vector having magnitude of relative eccentricity between said rotor forward and aft ends, and angular direction relative thereto; and
  said eccentricity vectors are stacked sequentially in vector addition in a loop.

3. A method according to claim 2 further comprising:
  measuring relative tilt between said rotor forward and aft ends;
  transforming said measured tilt at one of said rotors to projected eccentricity at a different one of said rotors;
  stacking said eccentricity vectors in said loop to include both said measured and projected eccentricities of said corresponding rotors; and assembling said rotors to correspond with said stacked eccentricity vectors.

4. A method according to claim 3 wherein:

said rotors include a forward rotor having a cylindrical forward end for being mounted in a first bearing, and an aft rotor having a cylindrical aft end for being mounted in a second bearing; and said projected eccentricities correspond with a common one of said cylindrical rotor ends for one of said bearings.

5. A method according to claim 4 further comprising iterating said vector stacking to minimize relative eccentricity between said forward and aft rotors.

6. A method according to claim 5 further comprising constraining said vector loop to minimize eccentricity of a rotor intermediate said forward and aft rotors.

7. A method according to claim 5 further comprising iterating said vector stacking to close said vector loop.

8. A method according to claim 5 wherein said rotors are assembled coaxially about said centerline axis with said eccentricity and tilt thereof having a collective rotary position about said centerline axis corresponding with said stacked vectors.

9. A method according to claim 5 wherein said rotors comprise gas turbine engine rotor disks for supporting corresponding rows of rotor blades extending radially outwardly therefrom.

10. A method according to claim 9 wherein said forward and aft rotor ends between said cylindrical ends comprise radial flanges each having a plurality of circumferentially spaced apart bolt holes extending therethrough.

11. A rotary assembly stacked together in accordance with the method of claim 1, with said relative eccentricities for said plurality of rotors having different rotary positions.

12. A method of axially assembling a plurality of gas turbine engine rotors about an axial centerline axis comprising:

measuring relative eccentricity between forward and aft annular mounting ends of each of said rotors, with said measured eccentricity being a vector having magnitude of relative eccentricity between said rotor forward and aft ends, and angular direction relative thereto;

analytically stacking said measured rotor eccentricity vectors sequentially in vector addition in a loop to minimize eccentricity from said centerline axis; and assembling said rotors axially end-to-end to correspond with said stacked eccentricity vectors thereof.

13. A method according to claim 12 wherein:

said rotors include a forward rotor having a cylindrical forward end for being mounted in a first bearing, and an aft rotor having a cylindrical aft end for being mounted in a second bearing; and further comprising:

measuring relative tilt between said rotor forward and aft ends;

transforming said measured tilt at one of said rotors to projected eccentricity at said forward or aft rotor for a corresponding one of said bearings;

stacking said eccentricity vectors in said loop to include both said measured and projected eccentricities of said corresponding rotors; and assembling said rotors to correspond with said stacked eccentricity vectors.

14. A method according to claim 13 further comprising iterating said vector stacking to close said vector loop and eliminate relative eccentricity between said forward and aft rotors.

15. A method according to claim 14 further comprising constraining said vector loop to minimize eccentricity of a rotor intermediate said forward and aft rotors.

16. A rotor assembly comprising:

a plurality of annular rotors disposed coaxially about an axial centerline axis;

each of said rotors having forward and aft annular mounting ends, and relative eccentricity therebetween; and said rotors being stacked end-to-end with said relative eccentricity thereof having rotary positions different than in-phase and 180 degrees out-of-phase with each other for minimizing net eccentricity of said rotor assembly.

17. An assembly according to claim 16 wherein:

one of said rotors has relative tilt between said forward and aft ends, and corresponding projected eccentricity at one end of said assembly; and said relative eccentricity and projected eccentricity for said one rotor have a collective rotary position different than said eccentricity positions of said adjoining rotors.

18. An assembly according to claim 17 wherein:

said eccentricity of each of said rotors comprises a vector having magnitude and angular direction; and said eccentricity vectors are stacked sequentially in vector addition in a loop.

19. An assembly according to claim 18 wherein said vector loop is closed.

20. An assembly according to claim 19 wherein said rotors comprise gas turbine engine rotor disks for supporting corresponding rows of rotor blades extending radially outwardly therefrom.

* * * * *